United States Patent [19]

Grossman et al.

[11] Patent Number: 4,910,696

[45] Date of Patent: Mar. 20, 1990

[54] COMPUTERIZED PERSONAL PORTABLE ACCOUNT REGISTER

[76] Inventors: Kurt W. Grossman, 25162 Charlinda, #J-150, Mission Viejo, Calif. 92691; Jorand C. Bratko, 1530 W. Fargo, #3N, Chicago, Ill. 60626

[21] Appl. No.: 148,856

[22] Filed: Jan. 27, 1988

[51] Int. Cl.⁴ .......................................... G06F 13/00
[52] U.S. Cl. .................................... 364/705.02
[58] Field of Search ................ 364/408, 406, 705.02

[56] References Cited

U.S. PATENT DOCUMENTS

| | | | |
|---|---|---|---|
| 3,920,979 | 11/1975 | Kilby et al. | 364/705.02 |
| 4,222,109 | 9/1980 | Siwula | 364/705.02 |
| 4,228,516 | 10/1980 | Johnston | 364/602 |
| 4,308,588 | 12/1981 | Siwula | 364/705.02 |
| 4,367,526 | 1/1983 | McGeary et al. | 374/5 |
| 4,486,849 | 12/1984 | Harigaya et al. | 364/709.04 |
| 4,516,016 | 5/1985 | Kodron | 235/472 |
| 4,528,638 | 7/1985 | Hatta et al. | 364/709.02 |
| 4,623,965 | 11/1986 | Wing | 364/408 |
| 4,724,527 | 2/1988 | Nishimura et al. | 364/705.02 |

OTHER PUBLICATIONS

Texas Instruments, 1986, excerpts from a calculator catalogue. Unisonic Catalogue, pp. 11-12.
"The Canon Advantage", 1986.
Quicken, "End Financial Hassles".
"Sylvia Porter's Personal Finance Series Manages it All", 1984.

Primary Examiner—David L. Clark
Assistant Examiner—Dale M. Shaw
Attorney, Agent, or Firm—Lockwood, Alex, Fitzgibbon & Cummings

[57] ABSTRACT

A computer device is provided which is sized and shaped to be hand-held. The computer device includes various memory modes and keys that are generally dedicated to provide particular command functions and to activate particular data channel circuitry for accomplishing account register functions and other functions such as budgeting and balancing. The computer device is especially suitable for use as a computerized checking account register.

24 Claims, 9 Drawing Sheets

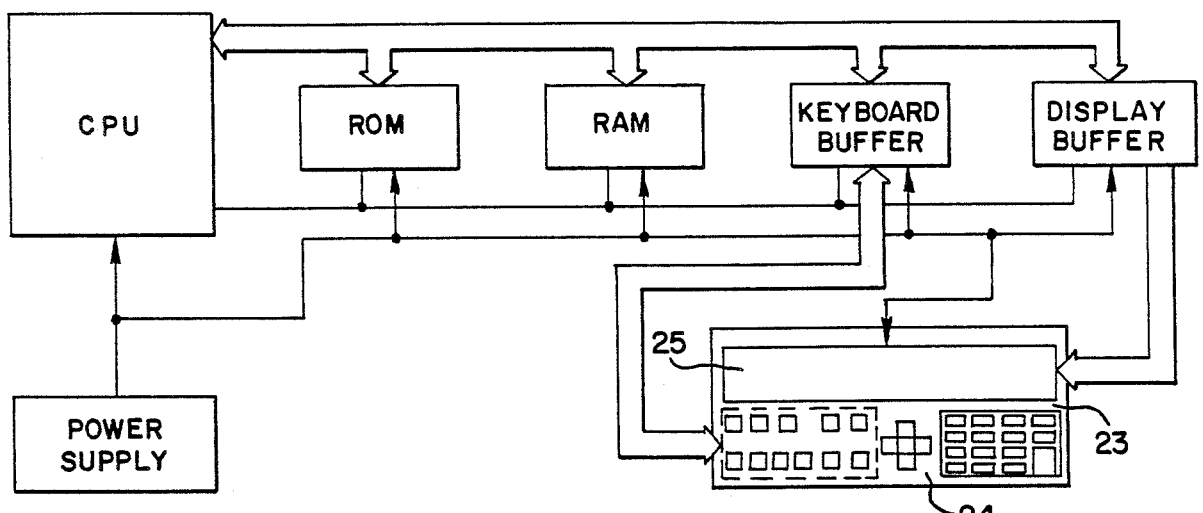
FIG-3-
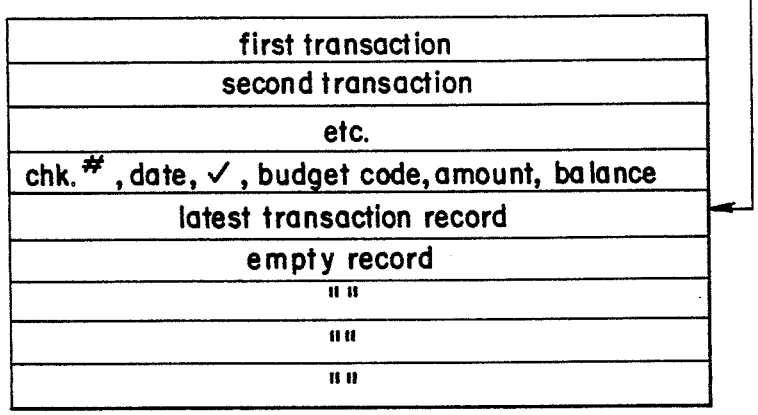
FIG-4-
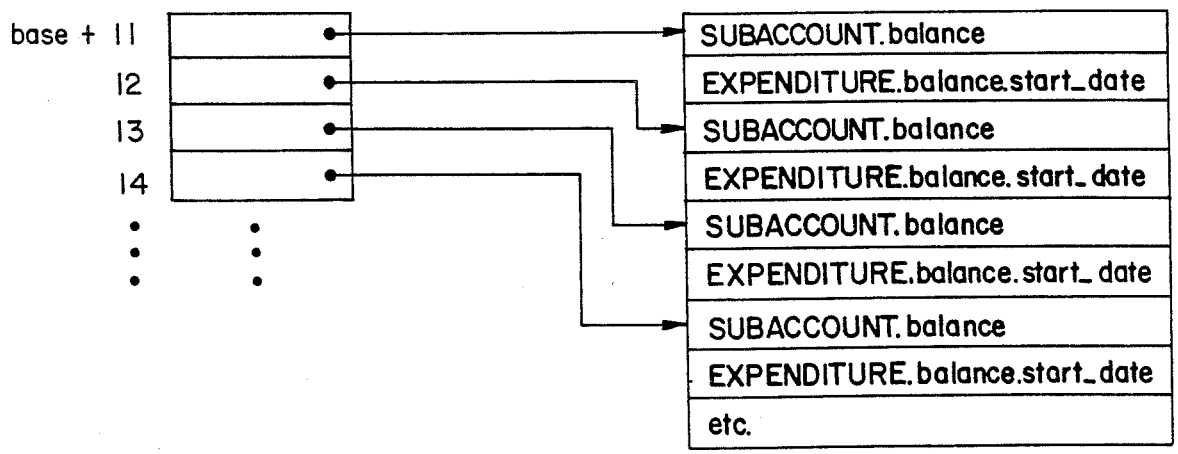
FIG-5-

FIG_9_

COMPUTERIZED PERSONAL PORTABLE ACCOUNT REGISTER

BACKGROUND AND DESCRIPTION OF THE INVENTION

This invention generally relates to portable, hand-held computer devices for automatically registering transactions and operating upon data input thereto. More particularly, the invention includes data channel circuitry that registers transactions such as the drawing of checks against a checking account. The computer device may also include circuitry for balancing the data register of the computer so as to be consistent with that of periodic statements of the banking or savings institution at which the account is held. The computer can further segregate transactions according to a budgeting scheme and provide prompts or the like when that budgeting scheme is violated or when the user proposes to violate the budgeting scheme.

Various computer systems or devices have been proposed or used which are of the portable, hand-held variety and which operate upon data input thereto by input members such as keys or the like. Often these key members or the like are associated with circuitry for automatically performing particular, designated functions. Examples include computer devices for metric conversion such as shown in United States Letters Pat. No. 4,228,516; computer systems for handling the consequences of different forms of competitive play, such as the golf calculator of United States Letters Pat. No. 4,367,526; computers for calculating compound interest such as shown in United States Letters Pat. No. 4,486,849; and shopping calculators with comparison features such as shown in United States Letters Pat. No. 4,528,638.

Also known are checkbook calculators having independent memories to monitor balances of checking accounts, charge accounts and the like. Devices in this category typically are merely calculators that permit one to keep track of account balances, but they do not automatically operate upon input data and memory data in order to serve as a true transaction register. Nor do such devices typically have the ability to carry out additional functions such as setting up and policing budgeting activities in order to provide automatic monitoring of spending patterns and the like.

Accordingly, there is a need for a computer device that is portable to the extent that it is of a hand-held or pocket size and that automatically performs certain functions, including those attendant to checkbook registers and that can also have the capacity for reconciling same with periodic account statements of banking and savings institutions and while further having the capacity to budget expenditures and monitor such budgeting.

These functions are accomplished in accordance with the present invention which includes a portable, hand-held computerized check register assembly that includes a control panel having a plurality of dedicated keys or control switches to impress input data into the computer assembly thereof and to provide command functions for accomplishing particular tasks. More particularly, certain of the control switches activate circuitry to accomplish specific tasks associated with one or more of a check register function, a budgeting function and an account balancing function. Preferably, the computerized check register is a component of a portable, pocket-sized device within a case having another portion including a pad of banking checks or the like.

It is accordingly a general object of the present invention to provide improved account registers.

Another object of this invention is to provide computerized account registers that achieve automatic implementation of certain operations associated with registering, budgeting and balancing of accounts.

Another object of the invention is to provide an improved check register that is computer-assisted and that simplifies tasks associated with checking account maintenance.

Another object of this invention is to provide an improved account register that incorporates budgeting and funds allocation features.

Another object of this invention is to provide an improved account register that functions to accumulate expenditures which are to be assessed against a specific account within the budgeting scheme.

Another object of the present invention is to provide a computerized account register device that includes a feature of locating common errors of account balancing and/or bookkeeping.

BRIEF DESCRIPTION OF THE DRAWINGS

These and other objects of the present invention will be apparent from the following detailed description, taken in conjunction with the accompanying drawings, wherein:

FIG. 3 is a schematic illustration of electronic circuitry that may be used within computerized device according to the invention;

FIG. 4 is an illustration of the memory organization system that may be used, particularly in association with the check register and the balancing function when included in the present invention;

FIG. 5 is an illustration of a typical memory organization useful in connection with the budgeting function that may be incorporated into the present invention;

DETAILED DESCRIPTION OF PREFERRED EMBODIMENTS

Figure 1:
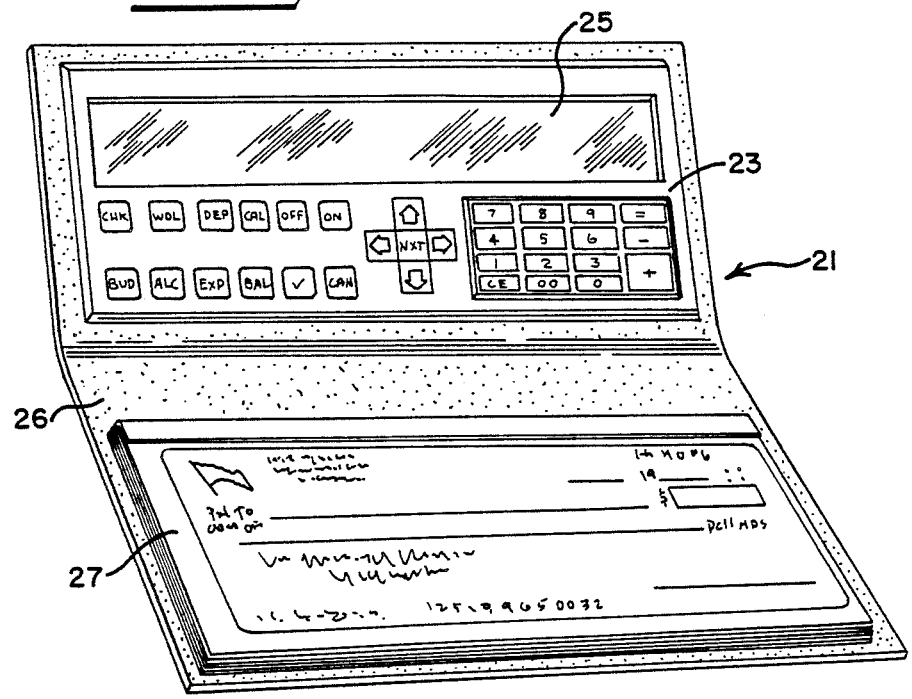
FIG. 1 is a perspective view of a typical computerized device in accordance with this invention.

A computerized personal portable account register device is generally designated by reference numeral 21 in FIG. 1. Such includes a housing 22 having a control unit therewithin which has a front face 23 having a keyboard panel 24 and a display panel 25, which is a visual indicator window on the face of the computer device. The housing 22 is supported by a pocket-sized case 26 which typically also includes a pad 27 of account slips such as bank checks or the like. The case 26 is sized and shaped so as to fit within a pocket or purse or the like so that the device is readily portable and can be easily held in the hand.

Figure 2:
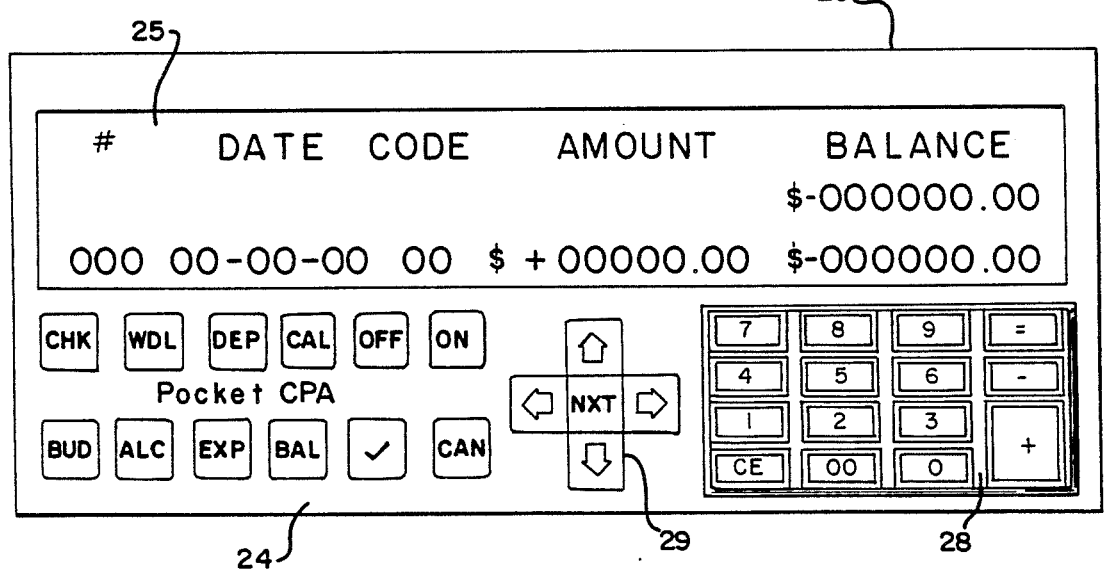
FIG. 2 is an elevational, enlarged view of the face of the control unit of the device illustrated in FIG. 1, further showing a display typical of the use of the invention as a computerized check register.

The front face 23 of the control unit is shown in further detail in FIG. 2. The keyboard portion 24 is a key panel with control buttons as illustrated. A typical calculator-type of keyboard 28 is provided for entering numerical digits and for commanding the accomplishment of typical calculator functions in association with other features of the invention. A cursor position controller 29 is further included in order to properly position the input location in accordance with the desired portion of the display 25 in order to thereby enter certain data such as the code number or the transaction amount. Keyboard panel 24 also includes a plurality of dedicated keys which either turn the display on or off or activate certain data channel circuit means in order to accomplish a particular function that is desired in connection with use of the present device.

The electronic circuitry shown in FIG. 3 includes a power supply of generally known type which is adequate to supply power to operate data channel circuitry in response to activation at the keyboard panel 24, while also providing power as necessary for maintaining the desired functionality of the Central Processing Unit (CPU) and the Read Only Memory (ROM) and Random Access Memory (RAM) memory units. The CPU delivers instructions in accordance with the data circuit sequences stored in the memory of the device. A keyboard buffer and a display buffer are also provided as needed.

Circuitry as illustrated in FIG. 3 is typically provided by a suitable printed circuit board assembly suspended for firm support within the housing 22. Such printed circuit board carries the needed electronics along with the CPU, ROM, RAM and the like, all of which elements are generally designated on the circuit board and appropriately connected to the proper key contacts with the keyboard panel 24, primarily through the keyboard buffer. A similar arrangement is provided with respect to the display panel 25 and the display buffer.

As an example of the typical operation of the calculator device 21, budgeted amounts can be entered into and stored in the memory, and a particular sequence of operations takes place by virtue of the data channel circuitry that operates when a control key is pressed, for example the "BUD" key. Once such a control function key is activated, the CPU interprets the instructions and activates the system to accomplish the operation specified by activation of this key. The changeable memory elements take the form of RAM units which are employed for memory of operational and working data. Fixed memory elements comprise semi-conductor ROM units that are typically used primarily for holding and implementing instructions according to a preset designation. The CPU controls input and processing of instructions and data. FIG. 3 illustrates circuitry that is only one of various electronic arrangements that could be utilized for accomplishing these features of the invention.

FIG. 4 illustrates a typical memory organization that is suitable for the register and balancing features of the present invention, although such can be achieved in different manners as desired. In the FIG. 4 illustration, the memory scheme is organized into transaction records, with each transaction record including desired data therefor, such as the illustrated "check #", "date", "√", "budget code", "amount", and "balance" categories. Each such individual transaction record contains all of such data from one entry in a register, such as a checkbook register or other account register.

The memory locations of subsequent register records are sequentially addressed, with the location or address of the latest entry being stored at a constant address, with pointer means also being utilized. The register and the pointer move with respect to each other; that is, either the register rolls or the pointer moves. This arrangement allows for an ordered storage of transactions so that a newly added transaction is indexed after the previous transaction and so that empty records are subsequently available. In addition to permitting entry of these data into an ordered fashion within the memory of the device, it is also possible, with suitable equipment, to offload such data into a suitable storage or reproduction device such as a computer having a larger capacity, a printer, or a mass storage system such as a magnetic tape device, which offloading will be in an ordered sequence. In this regard, a warning signal could be incorporated in order to inform the user that the capacity of the memory is about to be reached.

FIG. 5 illustrates a suitable memory organization for the budgeting circuitry that may be included in the invention. Each budget code is an offset from a constant base memory address. Indirect addressing is used to retrieve the data for each "subaccount". Data for "accounts" are summations of data for each "subaccount" within the particular account category. It is convenient to designate subaccounts by assigning the first digit thereof to be the same as the first digit of the "account" in respect of which each "subaccount" is a subcategory. The "base" illustrated in FIG. 5 is, generally speaking, a basic memory location that is assigned a particular designation, and the offset adds a number in order to properly locate the subaccount. For example, an account may have a designation "10" while subaccounts that are selected as offsets thereof may have designations such as the illustrated "11", "12", "13", "14" and so forth. These designations direct the computer to access the location where the desired data is actually stored.

Figure 6:
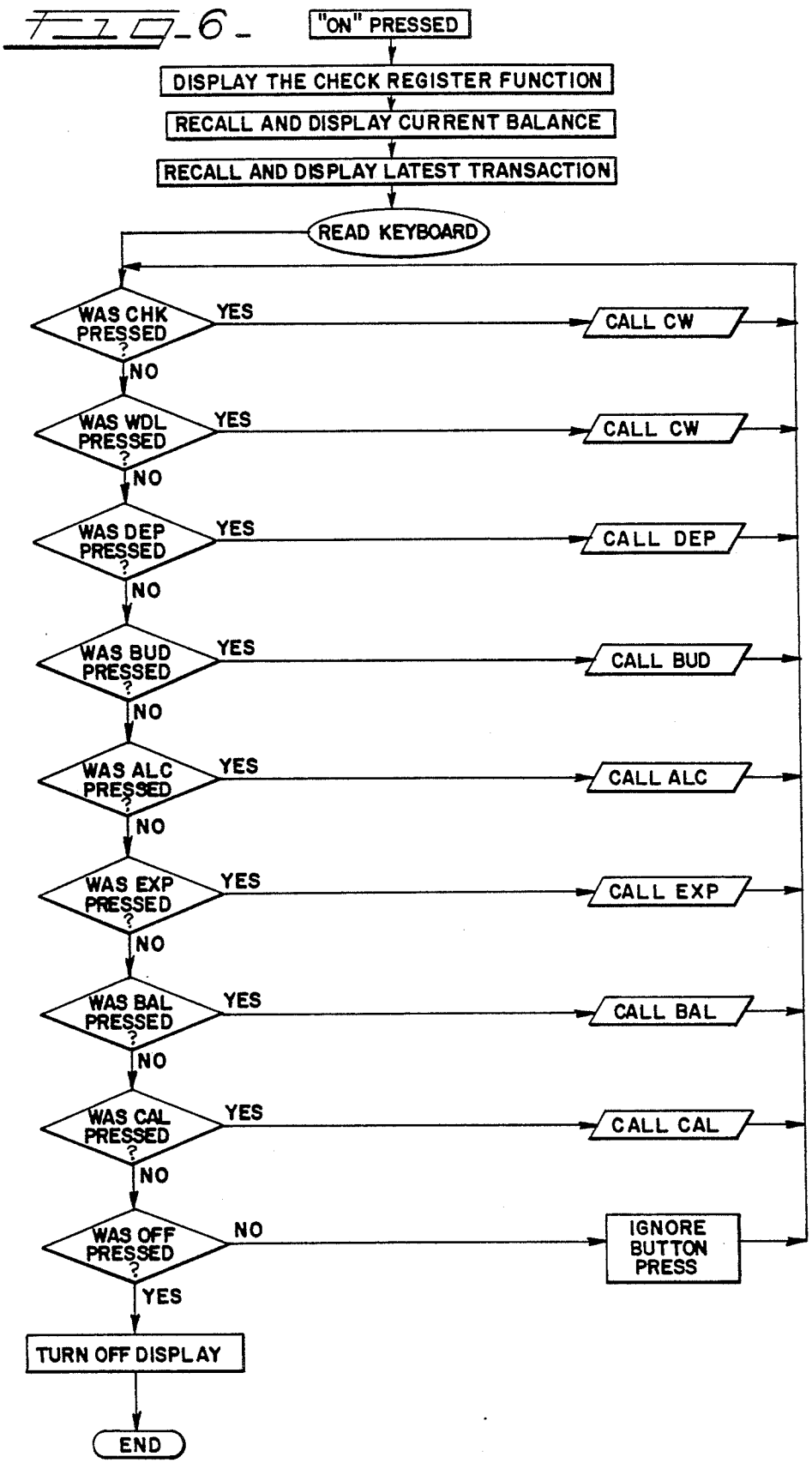
FIG. 6 is a flow chart illustrating paths for activating various data channel circuitry which can be called into operation by activation of function keys shown in FIG. 2.

Referring to FIG. 6, this illustrates the general circuitry that is typically provided to activate and select among the various data channel circuitry that can be included in order to carry out predetermined functions. In the illustrated embodiment, if either the "CHK" or the "WDL" keys are activated, then the "cw" data channel circuit means is called up for implementation thereof and for input thereinto of data needed to register a "check written" transaction or a "cash withdrawn" transaction. Activation of the other keys illustrated in FIG. 6 will likewise call up the respective data channel circuitry identified therewith. The "dep" circuitry is called up when a deposit is to be made, the "bud" circuitry is called up when a budget scheme is to be initiated, displayed or amended, the "alc" circuitry is called up when available funds are to be allocated into the various accounts within the budgeting scheme, the "exp" circuitry is called up when it is desired to determine the amount spent from a particular account within the budgeting scheme during a particular period, and the "bal" circuitry is called up when it is desired to balance or reconcile the account.

The "cal" circuitry is called up when it is desired to utilize the calculator keyboard 28 in a generally standard calculator mode. When the "CAL" key is activated, the calculator mode is put into operation, and its display is typically on one line of the display panel 25. In this regard, the computer device could further include keys for other operations such as multiplication, division and percentage calculations.

Figure 7:
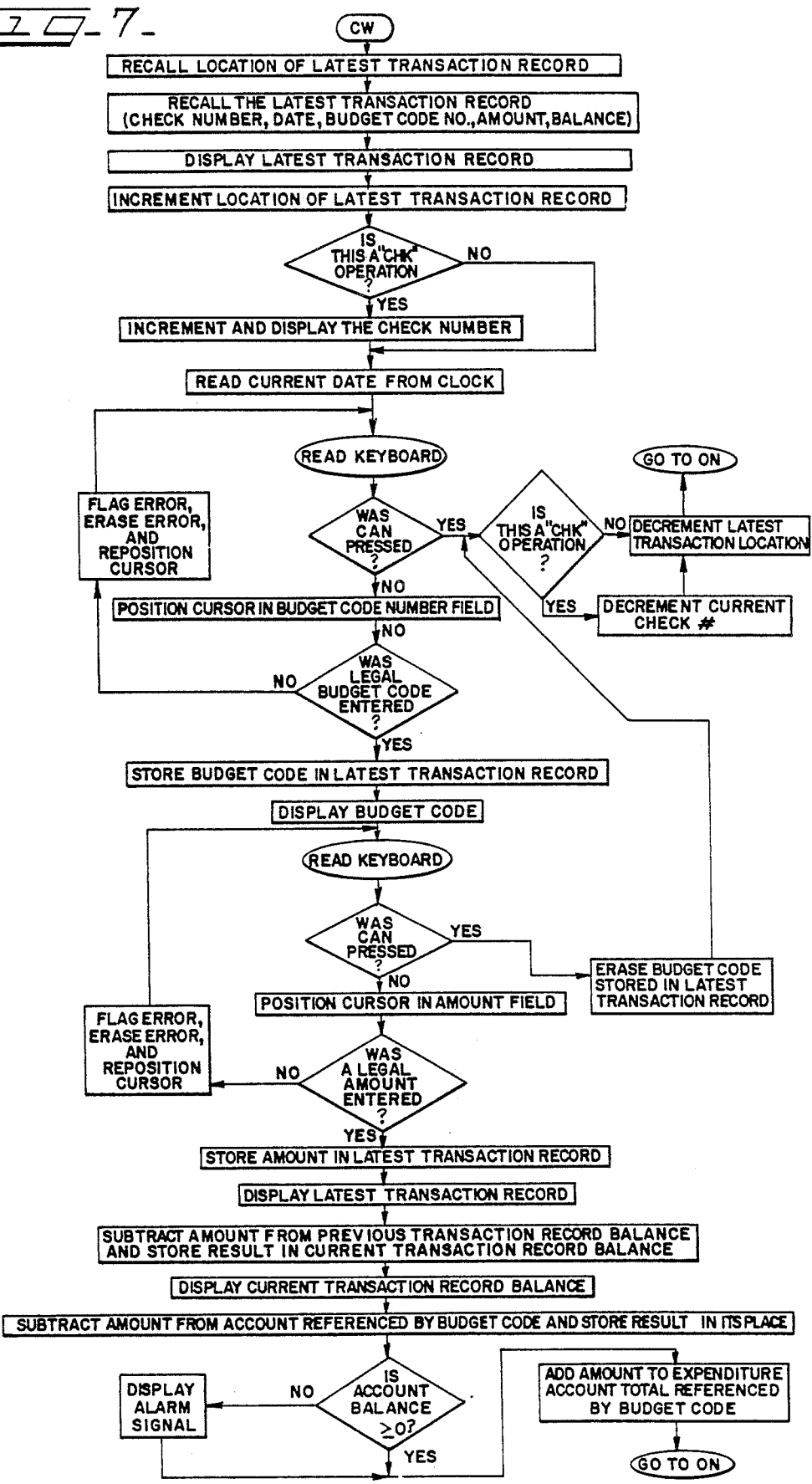
FIG. 7 is a flow diagram of the "cw" data channel circuit means associated with the "CHK" control switch activated during a check writing operation or associated with the "WDL" control switch activated during an account withdrawal operation.

FIG. 7 illustrates the "cw" data channel circuitry that is activated whenever the "CHK" key or the "WDL" key is implemented. When this circuitry is activated, the display of FIG. 2 is put up on the display panel 25. The "CHK" key is activated in order to initiate a check entry. This circuitry automatically increments to the next check number which is thus automatically entered into the memory and is displayed. The current date is similarly automatically stored and displayed. If it is desired to omit the inclusion of a check number or transaction number, then this operation can be omitted. If it is not omitted, then this data channel circuitry includes an adder circuit which adds one integer to the previous or latest check or transaction number which is automatically incremented by operation of the "cw" data channel circuitry.

Further data flow carried out by the "cw" data channel circuitry follows in FIG. 7 wherein the read keyboard mode is activated. If it is desired to not proceed with this particular transaction, then the "CAN" key can be pressed in order to decrement back to the previous latest check or transaction number and to the previous or latest transaction location so that both are in a position for subsequent sequential use of the "cw" data channel circuitry. If the transaction is to be continued with, then the cursor is positioned into the budget code number field and a budget code is entered. Provision is made for correction if an inaccurate budget code number is entered. The "cw" data channel circuitry provides for cancellation at this stage by pressing the "CAN" key.

If it is desired to continue with this transaction, then the cursor is positioned in the amount field and the amount of the transaction is entered. If this amount is "legal", then same is stored in the latest transaction record. If it is not legal, such as if entry was sought for an amount beyond the limits or capacity of the numbering system or the account, then such is flagged as an error and recycled for entry of a legal amount or cancellation of the transaction as desired. Provided it was decided to complete the transaction record, the amount is stored in the latest transaction record. It is also displayed and automatically passed to a subtractor circuit in order to reduce the previous transaction record balance by the amount of this particular transaction, which new transaction record balance is displayed.

When the budget mode is also utilized as illustrated, this subtractor circuit also operates on the budget account circuit corresponding to the budget code that had been entered for this current transaction, thereby storing a new budget account balance. Should this budget account balance be a negative number, then an appropriate flagging arrangement is carried out, such as the sounding or visual displaying of an alarm signal. When the amount is subtracted from the account referenced by the budget code, this achieves an interfacing with the "bud" channel circuitry, when provided. In addition, an additive circuit is provided to increase the expenditure account total by interfacing with the "exp" data channel circuitry illustrated in FIG. 11.

Figure 8:
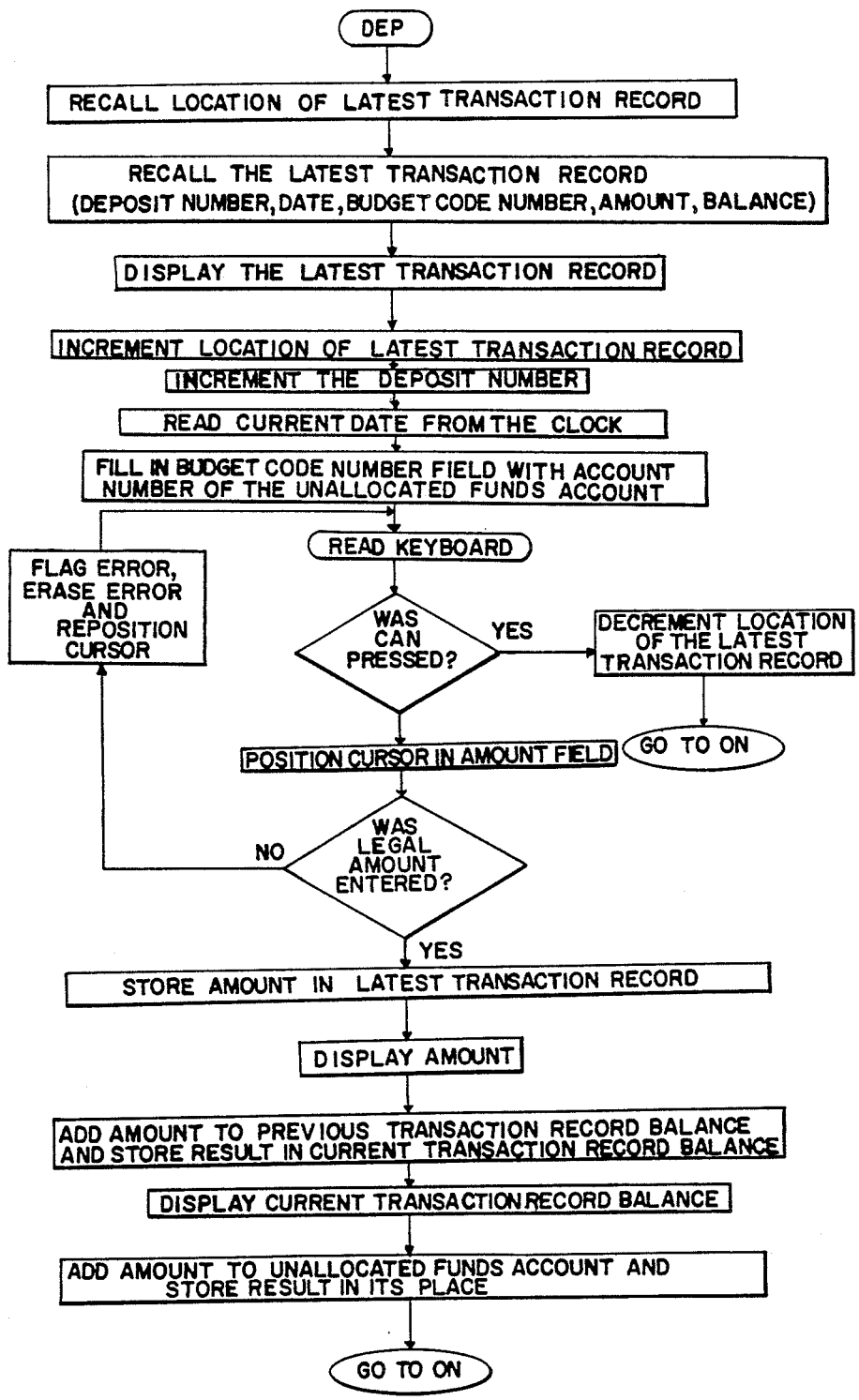
FIG. 8 is a flow diagram of the "dep" data channel circuit means associated with the "DEP" control switch shown in FIG. 6, such being utilized during depositing operations.

With reference to FIG. 8, the illustrated "dep" data channel circuitry permits the addition of fund amounts to the balance of selected accounts. Such entry can, for example, be into a so-called unallocated funds memory location or account. FIG. 8 illustrates such circuitry for entry into the unallocated funds account memory position. As is the case for other data channel circuitry, the "dep" data channel circuitry includes preliminary arrangements such as those of the recall or increment type in order to keep the data entered in sequential memory locations so that they can be retrieved at a later date. Thereafter, a deposit number or the like can be assigned to this deposit transaction by incrementing the next number through the operation of a suitable adding circuit which adds the value of one integer to the previous transaction deposit number or the like. An automatic clock circuit can be provided for implementing the current date into this deposit transaction record. The unallocated funds account number is then entered, automatically if desired, into the budget code number slot. Provision is made for cancellation at this stage. The cursor is then positioned into the amount field, and the user can enter a deposit amount, which would not be accepted if it is not "legal", that is if an entry error is made, such as by entering a negative number or one that is contrary to currency limitations, such as displaying less than whole cents. An adder circuit increases the previous transaction record balance by this deposit amount and stores and displays same. This adding circuit likewise records an increase in the unallocated funds account.

Figure 9:
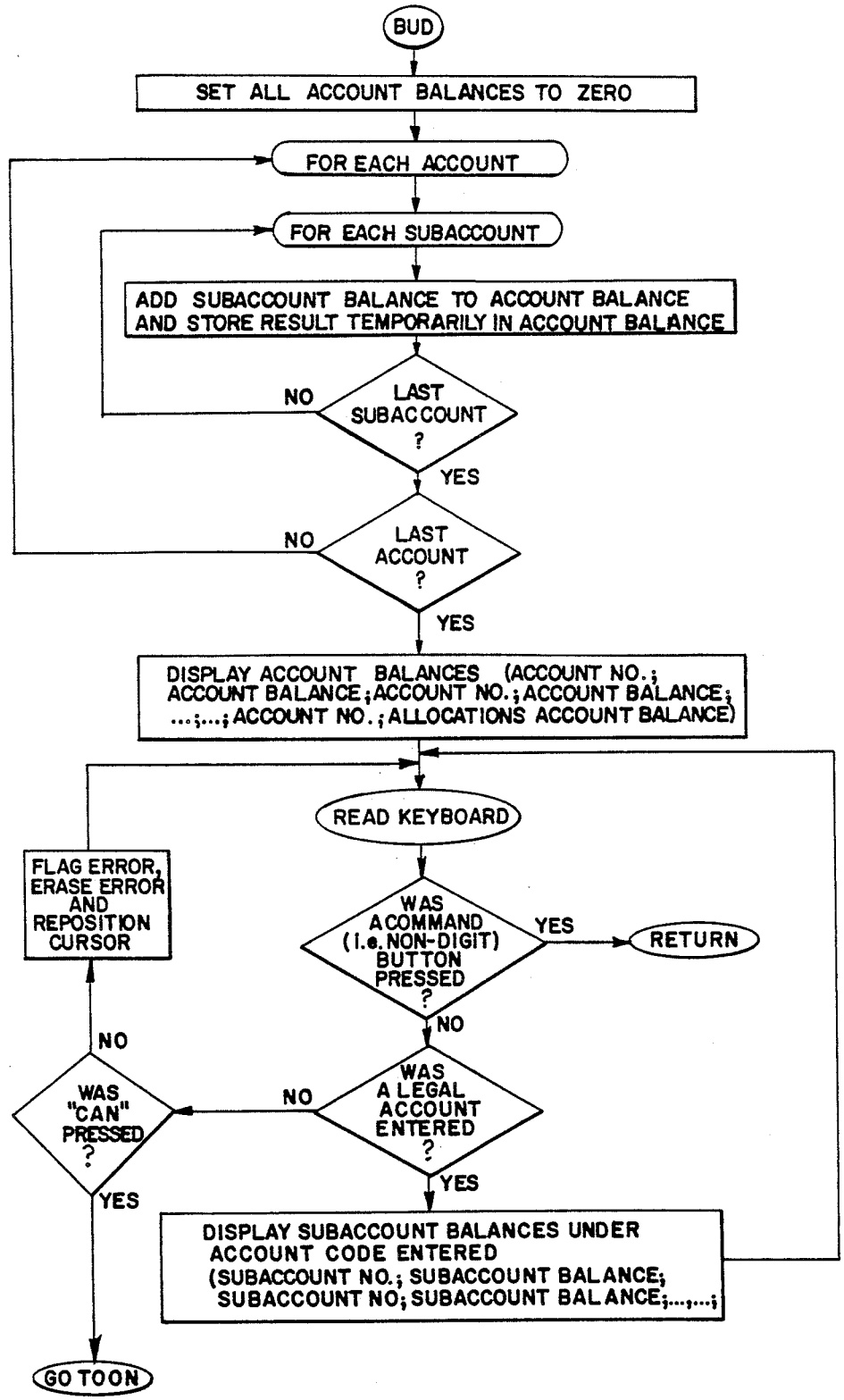
FIG. 9 is a flow diagram of the "bud" data channel circuit means when the "BUD" control switch is activated in order to enter budget accounts and subaccounts.

The "bud" data channel circuitry is illustrated in FIG. 9. By this circuitry, the user is provided with the ability to set up internal, independent accounts according to the budget code plan selected by the user. These accounts allow the user to pre-allocate fund amounts to various categories and to maintain a record of the balances of these accounts as well as a total of the withdrawals made from them. Withdrawals are made from these accounts by way of the "cw" data channel circuitry shown in FIG. 7, which automatically deduct the amount of a transaction from the account corresponding to the transaction's budget code. Such budgeting can be from fund amounts designated as being within the unallocated funds account according to the "dep" data channel circuitry. A subtractor circuit reduces the amount shown in the unallocated funds account when an amount is entered therefrom and into a particular budget coded account.

With more particular reference to FIG. 9, when it is desired to designate amounts within individual budget accounts, the "BUD" key is implemented in order to activate the "bud" data channel circuitry. Initially, account balances are set to zero in order to avoid double counting of budget amounts in both an account and a subaccount thereunder. It may not be desired to have both accounts and subaccounts, in which event the separate initial steps for accounts and subaccounts can be treated as single steps for accounts. A display is put up on the display portion 25 that has a form different from that illustrated in FIG. 2. Instead, the format is one that is shown in the center of FIG. 9, which displays account balances according to a simple, tabulated menu of a plurality of ordered accounts and corresponding balances. Each one of the sequential tabulations includes an account number and an account balance. A similar menu for displaying subaccounts under a particular account is also provided when both subaccounts and accounts are utilized.

FIG. 9 includes a circuit component stated as "Was a command (i.e. non-digit) button pressed?" in the penultimate diamond-shaped box in the center column of FIG. 9. This circuit component allows the user (after seeing the "Account balance" display, which lastly includes the balance of the allocations account) either to move to a subaccount display ("NO") or to choose another command ("YES"), such as "CAN" or "ALC".

Figure 10:
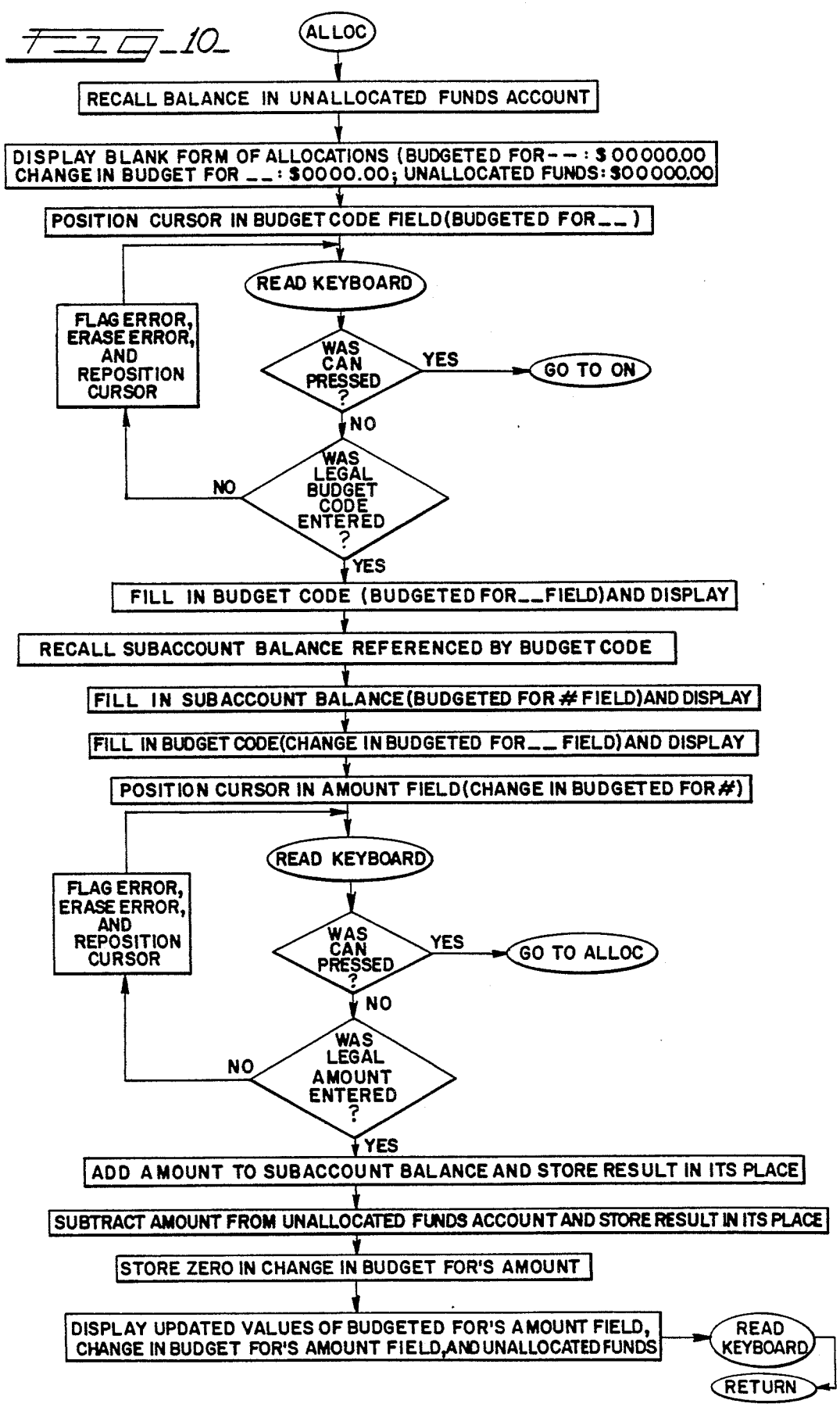
FIG. 10 is a flow diagram illustrating the "alc" data channel circuit means associated with the "ALC" control switch for allocating funds to each account or subaccount in association with the budgeting function.

When it is desired to allocate from the unallocated funds account, the account number therefor is entered by operation of the "alc" data channel circuitry illustrated in FIG. 10. In order to allocate funds to each account or subaccount within a particular budgeting scheme, the "alc" data channel circuitry is implemented by activating the "ALC" key which initially recalls the balance in the unallocated funds account. A display is put up, and the cursor is positioned in a manner to allocate funds to specific budget categories, with the "CAN" key available for activation if an error in entry is made. Amounts or percentages can be entered or changed in a general or in a prioritized fashion, whether within an account or a subaccount as generally shown in FIG. 10. Then the amount or percentage to be designated for this particular account or subaccount is entered after positioning the cursor in the amount field. The "alc" data channel circuitry has a subtractor circuit that automatically reduces the unallocated funds amount by the amount designated for each account or subaccount. Suitable displays of all accounts after the budgeting function has been completed can be carried out as desired.

The display format during use of the "alc" data channel circuitry is generally shown in the second box of FIG. 10. At all times during this display format, the third line of the display reports the balance of the unallocated funds account. When thus displayed, the cursor starts in the budget code field of the first line. When the budget code is entered, the current balance of this particular account or subaccount is displayed on the first line, and then the budget code is automatically repeated or displayed in the second line. The cursor moves to the amount field on the second line. After the amount is entered using the numeric keys, imparting a plus or a minus concludes the entry, thereby instructing the device to add or subtract the amount from the current budgeted amount of the particular account and inversely subtract or add this amount from the unallocated funds account or from some other account. During the "alc" mode, budgeted funds can be transferred from the unallocated funds account or from any other budget account when it is desired to shift designated funds from one budget category to another.

Figure 11:
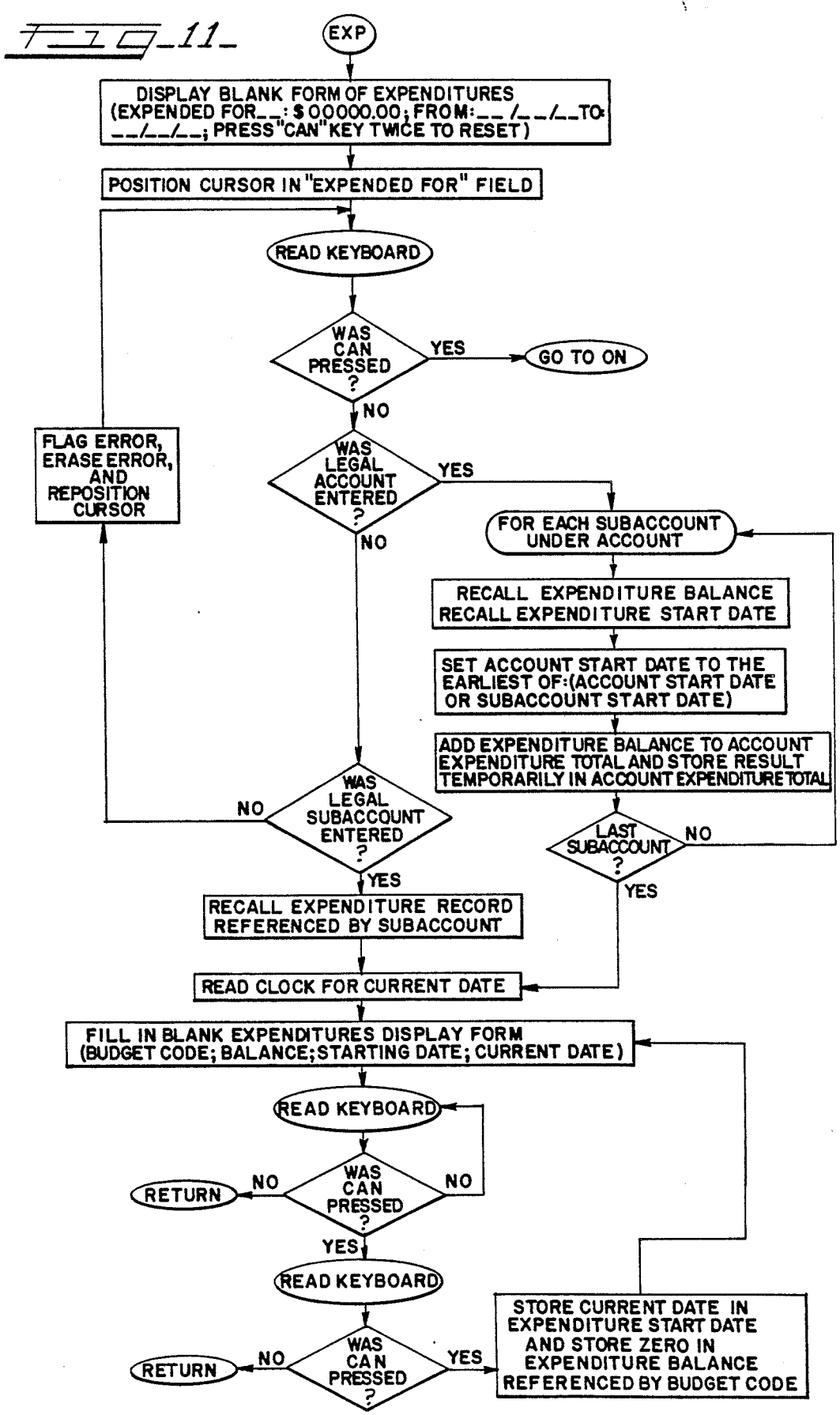
FIG. 11 is a flow diagram of the "exp" data channel circuit means associated with the "EXP" control switch, such being useful to accumulate and display running totals of expenditure items.

The "exp" data channel circuitry of FIG. 11 is provided for displaying the amount spent from a particular account specified during a particular time period. The display at the display panel 25, which is generally illustrated in the first box of FIG. 11, is called up upon activation of the "EXP" key. The desired account number is entered after the cursor is positioned at the "expended for" location. The circuitry recalls the expenditure balance during the dates designated on the display. An adding circuit adds the expenditure balance to an account expenditure total at a location in the memory. This procedure is repeated for each subaccount or account.

Figure 12:
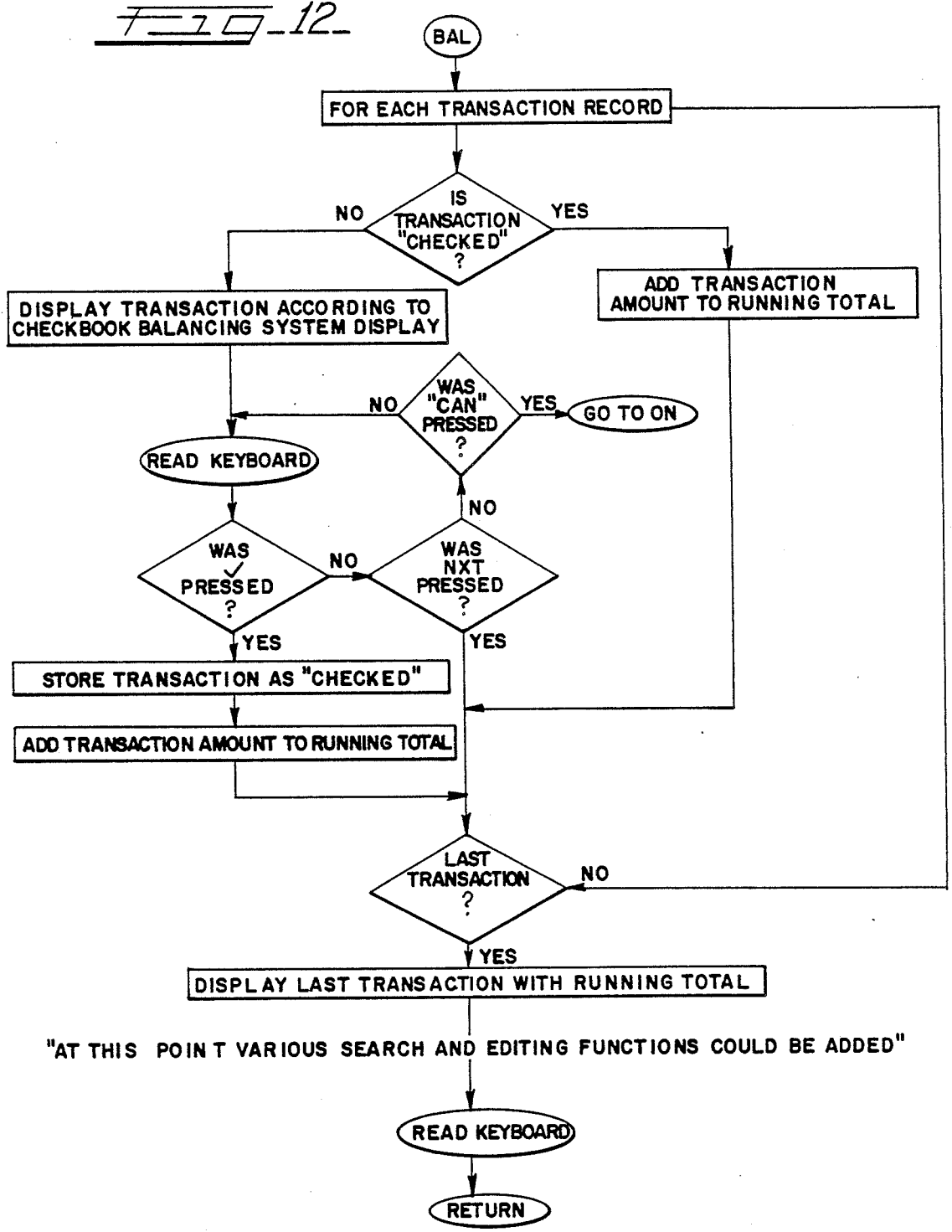
FIG. 12 is a flow diagram of the "bal" data channel circuit means associated with the "BAL" control switch activated during account reconciling operations.

The "bal" data channel circuitry of FIG. 12 can be used, for example, in connection with reconciling a checking account so as to be consistent with that of the financial institution which maintains the checking account. This "bal" circuitry gives the user the ability to declare checkbook register function entries as "cancelled". This circuitry also permits the user to edit or display past records for appropriate reasons, such as having a check returned because of insufficient funds, or in order to correct a mistake in recording of the particular transaction. A typical display that is called up upon activation of the "BAL" key is shown in the large box in the upper, left-hand portion of FIG. 12.

When operating within the "bal" data channel circuitry, activation of the "√" key declares that an entry is "cancelled", that is the transaction represented by this entry has been acknowledged by the financial institution or the like which maintains the particular account being balanced. The balance column in the display during the "bal" data channel circuitry mode is not modified (typically reduced in amount) by uncancelled entries into the other data channel circuitry modes, such as the "cw" mode. Such occurs only when the "√" mode is activated while the "bal" display is called up. When all entries made by the financial institution or the like are entered during the "bal" data channel circuitry mode, the last amount in the "balance" column should be the same as the balance specified in such statement of the financial institution or the like. If not, then it most likely that all entries were not properly recorded and cancelled.

Referring particularly to FIG. 12 regarding the "bal" data channel circuitry, the display for each transaction is called up, with each transaction record being displayed, typically in rolling sequence. The balanced total that was arrived at during the previous time that account reconciliation was performed is displayed. If the particular transaction being displayed is "checked", this is reflected in the balanced total. If that particular transaction is not "checked", the "√" key should be activated if it is shown as being cancelled on the statement of the financial institution or the like. The transaction is stored in memory, and a subtractor circuit of the "bal" data channel circuitry operates on the amount of that transaction in order to thereby decrease the balanced total carried in the "bal" data channel circuitry. This procedure continues until all cancelled entries on the financial institution's statement are "checked". The result is a "running total" or "balanced total" that corresponds to the balance shown on the statement of the financial institution or the like.

While many of the illustrations herein relate to registers of checking accounts, similar principles apply to registers of accounts that do not involve the preparation of checks or other transaction slips. In this instance, the display portion 25 would omit the "#" column shown, for example, in FIG. 2. Accordingly, principles generally in accordance with this invention are useful when one needs to store, keep and/or save funds and maintain control over those funds through a budgeting procedure. The device may be used for checking, savings, credit card and credit union balances and the like. There may be no need to proceed with a balancing function in this context, and the "bal" data channel circuitry could be omitted. Somewhat similarly, it might be desired to forego the budgeting function in a particular context such as one relating to checking registers, in which event the "bud" and "alc" and also the "exp" data channel circuitry can be omitted.

With respect to other keys shown on the keyboard portion 24, the "NXT" key moves the cursor to the next input field in order to move the cursor within the display panel 25 in a manner generally known. This permits the proper positioning of the input interface with the data category to be completed or revised. It also permits rolling back into the memory of the device in order to read previous entries and/or to edit any such entries in order to correct errors or make needed changes.

Activation of the "CAN" key erases an entry and all of its effects from the desired data channel circuitry. When desired, additional safety features can be implemented in order to substantially reduce the possibility of inadvertent cancellation of data. An example of this is found in the bottom portion of FIG. 11. At this location, the "exp" data channel circuitry illustrates a feature whereby it is necessary to activate the "CAN" key twice before expenditure information is erased from the memory of the computer device.

While particular embodiments of the invention have been described, it will be apparent to those skilled in the art that various modifications thereof may be made without departing from the true spirit and scope of the invention. Accordingly, it is intended by the appended claims to cover all such modifications and equivalents which embody the inventive features as defined in the claims.

We claim:

1. A computer device for a personal portable account register, comprising:
    a pocket-sized case including a relatively small housing, sized to be hand-held, said housing containing a computerized account register assembly, said housing having a display panel and a keyboard panel having a plurality of key members, said computerized account register assembly including circuit means for operating on, displaying and storing data in response to manipulation of said key members, said circuit means including:
    "cw" data channel circuit means responsive to activation of a "CHK" key member, said "cw" data channel circuit means including memory means for receiving a transaction amount, said "cw" data channel circuit means including means for assigning the transaction amount to a selected account, said "cw" data channel circuit means further including a subtractor circuit that automatically reduces a balance of a selected account by said transaction amount;
    "dep" data channel circuit means responsive to activation of a "DEP" key member, said "dep" data channel circuit means including means for assigning a deposit amount to a selected account, said "dep" data channel circuit means further including an adder circuit that automatically increases an account balance by said deposit amount;
    "bud" data channel circuit means responsive to activation of a "BUD" key member, said "bud" data channel circuit means including memory means for receiving data, specifying selected budget accounts, and displaying respective fund amounts as respective balances of the respective budget accounts; and
    said selected account of the "cw" data channel circuit means is one of said budget accounts of the "bud" data channel circuit means.

2. The computer device according to claim 1, wherein said "cw" data channel circuit further includes transaction number increment circuit means for automatically entering into the memory means of the "cw" data channel circuit means the next sequential transaction number, said transaction number increment circuit means including adder circuit means for adding the unit integer to the transaction number of the immediately previous transaction within said memory means of the "cw" data channel circuit means, said automatic entering step occurring upon activation of the "CHK" key member.

3. The computer device according to claim 1, wherein said "cw" data channel circuit further includes clock circuit means for automatically entering the current date into the memory means of the "cw" data channel circuit means upon activation of the "CHK" key member and upon activation of the "WDL" key member.

4. The computer device according to claim 1, wherein said "cw" data channel circuit further includes transaction number increment circuit means for automatically entering into the memory means of the "cw" data channel circuit means the next sequential transaction number, said transaction number increment circuit means including adder circuit means for adding the unit integer to the transaction number of the immediately previous transaction within said memory means of the "cw" data channel circuit means, said automatic entering step occurring upon activation of the "CHK" key member; and wherein said "cw" data channel circuit further includes clock circuit means for automatically entering the current date into the memory means of the "cw" data channel circuit means upon activation of the "CHK" key member and upon activation of the "WDL" key member.

5. The computer device according to claim 4, wherein said pocket-sized case further includes a portion supporting a pad of account slips for hand entry of transaction amounts.

6. The computer device according to claim 5, wherein said account slips are banking checks.

7. The computer device according to claim 1, wherein said "cw" data channel circuit means subtracts said transaction amount to one of said budget accounts and to another selected account.

8. A computer device for a personal portable account register, comprising:
    a pocket-sized case including a relatively small housing, sized to be hand-held, said housing containing a computerized account register assembly, said housing having a display panel and a keyboard panel having a plurality of key members, said computerized account register assembly including circuit means for operating on, displaying and storing data in response to manipulation of said key members, said circuit means including:

"bud" data channel circuit means responsive to activation of a "BUD" key member, said "bud" data channel circuit means including memory means for receiving data, specifying selected budget accounts, and displaying respective fund amounts as respective balances of the respective budget accounts;

"cw" data channel circuit means responsive to activation of a "CHK" key member and/or a "WDL" key member, said "cw" data channel circuit means including memory means for receiving a transaction amount, said "cw" data channel circuit means including means for assigning the transaction amount to a selected one of said budget accounts in response to activation of said "BUD" key member, said "cw" data channel circuit means further including a subtractor circuit that automatically reduces a balance of said selected budget account by said transaction amount; and "dep" data channel circuit means responsive to activation of a "DEP" key member, said "dep" data channel circuit means including means for assigning a deposit amount to a selected account, said "dep" data channel circuit means further including an adder circuit that automatically increases an account balance by said deposit amount.

9. The computer device according to claim 8, wherein said "bud" data channel circuit means further includes memory means for receiving data specifying selected budget subaccounts of said budget accounts and for assigning respective fund amounts as respective balances of the respective budget subaccounts.

10. The computer device according to claim 8, further including "exp" data channel circuit means including memory means for expenditure balances of said budget accounts and adder means for automatically increasing the expenditure balance of said selected one of said budget accounts by said transaction amount.

11. A computer device for a personal portable account register, comprising:

a pocket-sized case including a relatively small housing, sized to be hand-held, said housing containing a computerized account register assembly, said housing having a display panel and a keyboard panel having a plurality of key members, said computerized account register assembly including circuit means for operating on, displaying and storing data in response to manipulation of said key members, said circuit means including:

"cw" data channel circuit means responsive to activation of a "CHK" key member and/or a "WDL" key member, said "cw" data channel circuit means including memory means for receiving a transaction amount, said "cw" data channel circuit means including means for assigning the transaction amount to a selected account, said "cw" data channel circuit means further including a subtractor circuit that automatically reduces a balance of a selected account by said transaction amount;

"dep" data channel circuit means responsive to activation of a "DEP" key member, said "dep" data channel circuit means including means for assigning a deposit amount to a selected account, said "dep" data channel circuit means further including an adder circuit that automatically increases an account balance by said deposit amount;

"bud" data channel circuit means responsive to activation of a "BUD" key member, said "bud" data channel circuit means including memory means for receiving data, specifying selected budget accounts, and displaying respective fund amounts as respective balances of the respective budget accounts; and said selected account of the "dep" data channel means is one of said budget accounts of the "bud" data channel circuit means, said "dep" channel circuit means adds said deposit amount to one of said budget accounts and to another selected account.

12. A computer device for a personal portable account register, comprising:

a pocket-sized case including a relatively small housing, sized to be hand-held, sad housing containing a computerized account register assembly, said housing having a display panel and a keyboard panel having a plurality of key members, said computerized account register assembly including circuit means for operating on, displaying and storing data in response to manipulation of said key members, said circuit means including:

"cw" data channel circuit means responsive to activation of a "CHK" key member and/or a "WDL" key member, said "cw" data channel circuit means including memory means for receiving a transaction amount, said "cw" data channel circuit means including means for assigning the transaction amount to a selected account, said "cw" data channel circuit means further including a subtractor circuit that automatically reduces a balance of a selected account by said transaction amount;

"dep" data channel circuit means responsive to activation of a "DEP" key member, said "dep" data channel circuit means including means for assigning a deposit amount to a selected account, said "dep" data channel circuit means further including an adder circuit that automatically increases an account balance by said deposit amount;

"bud" data channel circuit means responsive to activation of a "BUD" key member, said "bud" data channel circuit means including memory means for receiving data, specifying selected budget accounts, and displaying respective fund amounts as respective balances of the respective budget accounts; and "alc" data channel circuit means responsive to activation of an "ALC" key member, said "alc" data channel circuit means including access to memory means for an unallocated funds account circuit, said "alc" data channel circuit means further including memory means for receiving data specifying a budget account and a fund amount for applying to said budget account, said "alc" data channel circuit means further including subtractor/adder circuit means for automatically changing the balance of said unallocated funds account by said fund amount applied to said budget account.

13. The computer device according to claim 12, wherein said "alc" data channel circuit means includes access to memory means of budget account circuitry, and said subtractor/adder circuit means is for automatically changing respective balances of said budget account memory means.

14. The computer device according to claim 13, wherein said "alc" data channel circuit means includes access to memory means for budget subaccounts of said budget accounts.

15. A computer device for a personal portable account register, comprising:
a pocket-sized case including a relatively small housing, sized to be hand-held, said housing containing a computerized account register assembly, said housing having a display panel and a keyboard panel having a plurality of key members, said computerized account register assembly including circuit means for operating on, displaying and storing data in response to manipulation of said key members, said circuit means including:

"cw" data channel circuit means responsive to activation of a "CHK" key member and/or a "WDL" key member, said "cw" data channel circuit means including memory means for receiving a transaction amount, said "cw" data channel circuit means including means for assigning the transaction amount to a selected account, said "cw" data channel circuit means further including a subtractor circuit that automatically reduces a balance of a selected account by said transaction amount;

"dep" data channel circuit means responsive to activation of a "DEP" key member, said "dep" data channel circuit means including means for assigning a deposit amount to a selected account, said "dep" data channel circuit means further including an adder circuit that automatically increases an account balance by said deposit amount; and "exp" data channel circuit means responsive to activation of an "EXP" key member, said "exp" data channel circuit means including access to memory means for said selected accounts, said "exp" data channel circuit means further including circuit means for entry of a particular time period and for calling up the amount expended against said selected account during said particular time period.

16. The computer device according to claim 15, wherein said "cw" data channel means further includes adder circuit means for automatically adding said transaction amount to an account expenditure total stored in memory means, said selected account of the "cw" data channel means is a budget account.

17. A computer device for a personal portable account register, comprising:
a pocket-sized case including a relatively small housing, sized to be hand-held, said housing containing a computerized account register assembly, said housing having a display panel and a keyboard panel having a plurality of key members, said computerized account register assembly including circuit means for operating on, displaying and storing data in response to manipulation of said key members, said circuit means including:

"cw" data channel circuit means responsive to activation of a "CHK" key member and/or a "WDL" key member, said "cw" data channel circuit means including memory means for receiving a transaction amount, said "cw" data channel circuit means including means for assigning the transaction amount to a selected account, said "cw" data channel circuit means further including a subtractor circuit that automatically reduces a balance of a selected account by said transaction amount;

"dep" data channel circuit means responsive to activation of a "DEP" key member, said "dep" data channel circuit means including means for assigning a deposit amount to a selected account, said "dep" data channel circuit means further including an adder circuit that automatically increases an account balance by said deposit amount;

"bal" data channel circuit means responsive to activation of a "BAL" key member;

said "bal" data channel circuit means includes memory means for sequentially storing a plurality of transaction identifications, a plurality of transaction amounts, a financial institution balance, and cancelled designator means for memorizing reduction of or addition to the financial institution balance by a particular transaction amount;

said "bal" data channel circuit means further includes circuitry responsive to activation of a "√" key member, which circuitry includes circuit means for decreasing or increasing said financial institution balance by a transaction amount when said "√" key member is activated in respect of a transaction identification corresponding to said transaction amount; and said memory means is a component of said "cw" data channel circuit means.

18. A personal portable computer device that is a checking account register, comprising:
a pocket-sized case including a portion supporting a pad of checks, said case also including a relatively small housing, sized to be hand-held, said housing containing a computerized checking account register assembly, said housing having a display panel and a keyboard panel having a plurality of key members, said computerized checking account register assembly including circuit means for operating on, displaying and storing data in response to manipulation of said key members, said circuit means including:

"cw" data channel circuit means responsive to activation of a "CHK" key member, said "cw" data channel circuit means including memory means for receiving a transaction amount, said "cw" data channel circuit means including means for assigning the transaction amount to a selected account, said "cw" data channel circuit means further including a subtractor circuit that automatically reduces a balance of a selected account by said transaction amount;

"dep" data channel circuit means responsive to activation of a "DEP" key member, said "dep" data channel circuit means including means for assigning a deposit amount to a selected account, said "dep" data channel circuit means further including an adder circuit that automatically increases an account balance by said deposit amount;

said "cw" data channel means circuit further includes check number increment circuit means for automatically entering into the memory means of the "cw" data channel circuit means the next sequential check number, said check number increment circuit means including adder circuit means for adding the unit integer to the check number of the immediately previous checking transaction within said memory means of the "cw" data channel circuit means, said automatic entering step occurring upon activation of the "CHK" key member; and "exp" data channel circuit means responsive to activation of an "EXP" key member, said "exp" data channel circuit means including access to memory means for said selected accounts, said "exp" data channel circuit means further including circuit means for entry of a particular time period and for calling up the amount expended against said selected account during said particular time period.

19. The personal portable computer device according to claim 18, wherein said "cw" data channel circuit further includes clock circuit means for automatically entering the current date into the memory means of the "cw" data channel circuit means upon activation of the "CHK" key member and upon activation of the "WDL" key member.

20. The personal portable computer device according to claim 18, further including "bal" data channel circuit means responsive to activation of a "BAL" key member;

said "bal" data channel circuit means includes memory means for sequentially storing a plurality of check transactions, each including a check amount, a financial institution balance, and a "√" designator means for memorializing reduction of or addition to the checking account balance by a particular check amount; and said "bal" data channel circuit means further includes circuitry responsive to activation of a "√" key member, which circuitry includes circuit means for decreasing or increasing said checking account balance by a check amount when said "√" key member is activated in respect of a check transaction corresponding to said check amount.

21. The personal portable computer device according to claim 20, wherein said memory means of the "bal" data channel circuit means further is for sequentially storing check transactions including check numbers and check dates.

22. A personal portable computer device that is a checking account register, comprising:

a pocket-sized case including a portion supporting a pad of checks, said case also including a relatively small housing, sized to be hand-held, said housing containing a computerized checking account register assembly, said housing having a display panel and a keyboard panel having a plurality of key members, said computerized checking account register assembly including circuit means for operating on, displaying and storing data in response to manipulation of said key members, said circuit means including:

"bud" data channel circuit means responsive to activation of a "BUD" key member, said "bud" data channel circuit means including memory means for receiving data specifying selected budget accounts and displaying respective fund amounts as respective balances of the respective budget accounts;

"cw" data channel circuit means responsive to activation of a "CHK" key member and/or a "WDL" key member, said "cw" data channel circuit means including memory means for receiving a transaction amount, said "cw" data channel circuit means including means for assigning the transaction amount to a selected one of said budget accounts in response to activation of said "BUD" key member, said "cw" data channel circuit means further including a subtractor circuit that automatically reduces a balance of said selected budget account by said transaction amount;

"cw" data channel circuit means responsive to activation of a "DEP" key member, said "dep" data channel circuit means including means for assigning a deposit amount to a selected account, said "dep" data channel circuit means further including an adder circuit that automatically increases an account balance by said deposit amount; and said "cw" data channel means circuit further includes check number increment circuit means for automatically entering into the memory means of the "cw" data channel circuit means the next sequential check number, said check number increment circuit means including adder circuit means for adding the unit integer to the check number of the immediately previous checking transaction within said memory means of the "cw" data channel circuit means, said automatic entering step occurring upon activation of the "CHK" key member.

23. The personal portable computer device according to claim 22, further including "exp" data channel circuit means including memory means for expenditure balances of said budget accounts and adder means for automatically increasing the expenditure balance of said selected one of said budget accounts by said transaction amount.

24. A personal portable computer device that is a checking account register, comprising:

a pocket-sized case including a portion supporting a pad of checks, said case also including a relatively small housing, sized to be hand-held, said housing containing a computerized checking account register assembly, said housing having a display panel and a keyboard panel having a plurality of key members, said computerized checking account register assembly including circuit means for operating on, displaying and storing data in response to manipulation of said key members, said circuit means including:

"cw" data channel circuit means responsive to activation of a "CHK" key member and/or a "WDL" key member, said "cw" data channel circuit means including memory means for receiving a transaction amount, said "cw" data channel circuit means including means for assigning the transaction amount to a selected account, said "cw" data channel circuit means further including a subtractor circuit that automatically reduces a balance of a selected account by said transaction amount;

"dep" data channel circuit means responsive to activation of a "DEP" key member, said "dep" data channel circuit means including means for assigning a deposit amount to a selected account, said "dep" data channel circuit means further including an adder circuit that automatically increases an account balance by said deposit amount;

said "cw" data channel means circuit further includes check number increment circuit means for automatically entering into the memory means of the "cw" data channel circuit means the next sequential check number, said check number increment circuit means including adder circuit means for adding the unit integer to the check number of the immediately previous checking transaction within said memory means of the "cw" data channel circuit means, said automatic entering step occurring upon activation of the "CHK" key member;

"bud" data channel circuit means responsive to activation of a "BUD" key member, said "bud" data channel circuit means including memory means for receiving data specifying selected budget accounts and displaying respective fund amounts as respective balances of the respective budget accounts; and "alc" data channel circuit means responsive to activation of an "ALC" key member, said "alc" data channel circuit means including access to memory means for an unallocated funds account circuit, said "alc" data channel circuit means further including memory means for receiving data specifying a budget account and a fund amount for applying to said budget account, said "alc" data channel circuit means further including subtractor/adder circuit means for automatically changing the balance of said unallocated funds account by said fund amount applied to said budget account.

* * * * *

UNITED STATES PATENT AND TRADEMARK OFFICE
CERTIFICATE OF CORRECTION

PATENT NO. : 4,910,696

DATED : March 20, 1990

INVENTOR(S) : Kurt W. Grossman and Jorand C. Bratko

It is certified that error appears in the above-identified patent and that said Letters Patent is hereby corrected as shown below:

```
Col.  2, line 37, "device" should read --devices--.
Col.  6, line 55, "deduct" should read --deducts--.
Col. 15, line 66, ""cw"" should read --"dep"--.
```

Signed and Sealed this

Sixth Day of April, 1993

*Attest:*

STEPHEN G. KUNIN

*Attesting Officer*  Acting Commissioner of Patents and Trademarks